(12) United States Patent
Distaso et al.

(10) Patent No.: US 12,265,315 B2
(45) Date of Patent: Apr. 1, 2025

(54) OVEN CAMERA ASSEMBLY WITH HEAT MANAGEMENT STRUCTURES

(71) Applicant: WHIRLPOOL CORPORATION, Benton Harbor, MI (US)

(72) Inventors: Luca Distaso, Gemonio (IT); Elizabeth N. Kacpura, St. Joseph, MI (US); Adrian Pochojka, Tuchola (PL)

(73) Assignee: WHIRLPOOL CORPORATION, Benton Harbor, MI (US)

( * ) Notice: Subject to any disclaimer, the term of this patent is extended or adjusted under 35 U.S.C. 154(b) by 464 days.

(21) Appl. No.: 17/588,512

(22) Filed: Jan. 31, 2022

(65) Prior Publication Data
US 2023/0244127 A1   Aug. 3, 2023

(51) Int. Cl.
*F24C 15/34*   (2006.01)
*F24C 15/00*   (2006.01)
*G03B 17/55*   (2021.01)
*G03B 29/00*   (2021.01)

(52) U.S. Cl.
CPC ............ *G03B 17/55* (2013.01); *F24C 15/004* (2013.01); *F24C 15/34* (2013.01); *G03B 29/00* (2013.01)

(58) Field of Classification Search
CPC ................................ G03B 17/55; G03B 29/00
See application file for complete search history.

(56) References Cited

U.S. PATENT DOCUMENTS

| | | | |
|---|---|---|---|
| 7,696,454 B2 * | 4/2010 | Nam | F24C 3/126 |
| | | | 219/393 |
| 9,982,895 B2 | 5/2018 | Ruther | |
| 10,731,864 B2 | 8/2020 | Wild | |
| 10,794,599 B2 | 10/2020 | Jang et al. | |
| 11,060,735 B2 | 7/2021 | Bhogal et al. | |
| 2012/0099761 A1 | 4/2012 | Yoon et al. | |
| 2014/0048055 A1 | 2/2014 | Ruther | |
| 2015/0160536 A1 * | 6/2015 | Lang | G03B 17/55 |
| | | | 348/374 |
| 2018/0058702 A1 * | 3/2018 | Jang | F24C 7/081 |
| 2020/0019861 A1 | 1/2020 | Jeong | |
| 2020/0069111 A1 | 3/2020 | Eiter et al. | |
| 2021/0144286 A1 | 5/2021 | Jang et al. | |

FOREIGN PATENT DOCUMENTS

| | | |
|---|---|---|
| CN | 107788862 A | 3/2018 |
| CN | 110613363 B | 12/2019 |
| EP | 3667172 A1 | 6/2020 |
| WO | 2019100527 A1 | 5/2019 |

* cited by examiner

*Primary Examiner* — Ko-Wei Lin
(74) *Attorney, Agent, or Firm* — Price Heneveld LLP (57) ABSTRACT

A camera assembly includes an insulating block for mounting the camera against a surface in contact therewith and aligned with an opening through the surface. The insulating block defines an aperture therethrough, a lower side of the aperture being aligned with the opening in the surface. The assembly further includes a sink washer mounted to the insulating block in partial contact therewith and extending outward from the top side of the aperture. A camera is mounted to the sink washer and has a lens directed through the aperture in the insulating block and through the opening in the surface. A glass substrate is coupled within the lower side of the aperture to enclose an air gap within the aperture between the glass substrate and a housing of the camera.

18 Claims, 7 Drawing Sheets

OVEN CAMERA ASSEMBLY WITH HEAT MANAGEMENT STRUCTURES

BACKGROUND OF THE DISCLOSURE

The present disclosure generally relates to a camera assembly for an oven, and more specifically, to a camera mounting arrangement with thermal management structures suitable for use in high-heat locations within the oven.

Many ovens include internal cameras directed to a portion of the interior cavity of the oven to provide a view of the food to the user, including via an integrated interface, an external device or the like, among other purposes. The digital electronic cameras used for these purposes have limited "survival" temperatures, including upper temperature limits, above which one or more components of the camera may become damaged such that the camera loses some or all functionality. Notably, these temperatures are lower than some temperatures reached within certain areas of the oven cavity, particularly toward the top and rear of an oven cavity. Accordingly, oven cameras are typically positioned away from this area, even though a view of the back of the food within an oven may be beneficial.

SUMMARY OF THE DISCLOSURE

According to one aspect of the present disclosure, an oven includes a liner defining a cooking cavity having an open side, a back wall opposite the open side, and a top wall extending between the open side and the back wall. The top wall has a camera opening defined therethrough in a position more proximate to the back wall than the front wall. The oven further includes a camera assembly mounted on the top wall of the liner outside the cooking cavity and having an insulating block contacting the top wall of the liner and defining an aperture therethrough. A lower side of the aperture is aligned with the camera opening in the top wall of the liner. The camera assembly also has a sink washer having a hole therethrough aligned with a top side of the aperture through the insulating block. The sink washer is mounted to the insulating block in partial contact therewith and extending outward from the top side of the aperture. A camera is mounted to the sink washer and has a lens directed through the aperture in the insulating block and through the camera opening in the top wall of the liner. The sink washer directs heat from the camera away from the camera and away from the top wall of the liner.

According to another aspect of the present disclosure, an oven includes a liner defining a cooking cavity having an open side, a back wall opposite the open side, and a top wall extending between the open side and the back wall. The top wall has a camera opening defined therethrough in a position more proximate to the back wall than the front wall. The oven further includes a camera assembly mounted on the top wall of the liner outside the cooking cavity and including an insulating block contacting the top wall of the liner and defining an aperture therethrough. A lower side of the aperture is aligned with the camera opening in the top wall of the liner. The camera assembly further includes a camera mounted over the insulating block and having a lens directed through the aperture in the insulating block and through the camera opening in the top wall of the liner and a glass substrate coupled within the lower side of the aperture to enclose an air gap within the aperture between the glass substrate and a housing of the camera.

According to yet another aspect of the present disclosure, a camera assembly includes an insulating block for mounting the camera against a surface in contact therewith and aligned with an opening through the surface. The insulating block defines an aperture therethrough, a lower side of the aperture being aligned with the opening in the surface. The assembly further includes a sink washer having a hole therethrough aligned with a top side of the aperture through the insulating block. The sink washer is mounted to the insulating block in partial contact therewith and extending outward from the top side of the aperture. A camera is mounted to the sink washer and has a lens directed through the aperture in the insulating block and through the opening in the surface. The sink washer directs heat from the camera away from the camera and away from the surface. A glass substrate is coupled within the lower side of the aperture to enclose an air gap within the aperture between the glass substrate and a housing of the camera.

These and other features, advantages, and objects of the present disclosure will be further understood and appreciated by those skilled in the art by reference to the following specification, claims, and appended drawings.

The components in the figures are not necessarily to scale, emphasis instead being placed upon illustrating the principles described herein.

DETAILED DESCRIPTION

The present illustrated embodiments reside primarily in combinations of method steps and apparatus components related to an oven. Accordingly, the apparatus components and method steps have been represented, where appropriate, by conventional symbols in the drawings, showing only those specific details that are pertinent to understanding the embodiments of the present disclosure so as not to obscure the disclosure with details that will be readily apparent to those of ordinary skill in the art having the benefit of the description herein. Further, like numerals in the description and drawings represent like elements.

Figure 1:
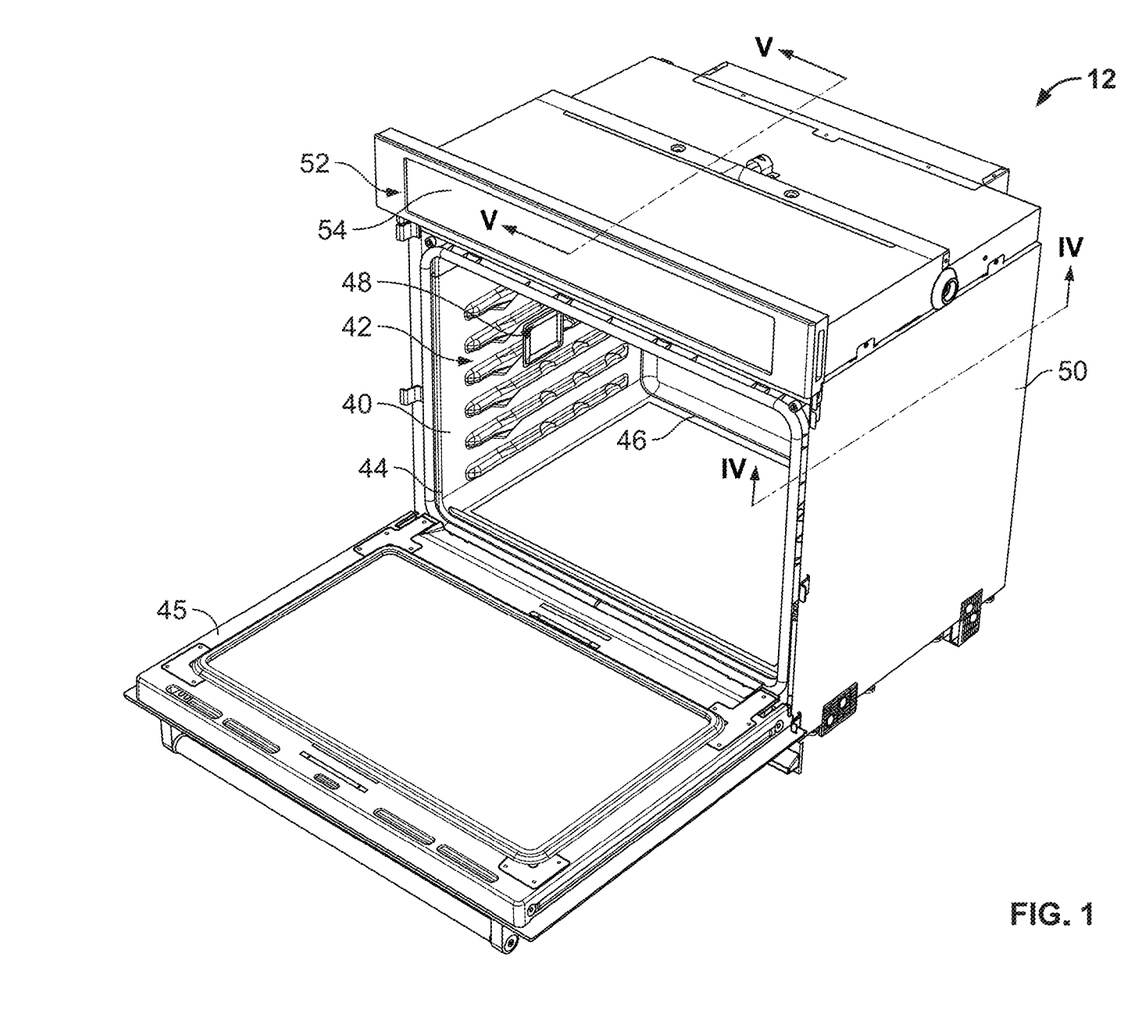
FIG. 1 is a front perspective view of an oven according to an aspect of the disclosure.

For purposes of description herein, the terms "upper," "lower," "right," "left," "rear," "front," "vertical," "horizontal," and derivatives thereof shall relate to the disclosure as oriented in FIG. 1. Unless stated otherwise, the term "front" shall refer to the surface of the element closer to an intended viewer, and the term "rear" shall refer to the surface of the element further from the intended viewer. However, it is to be understood that the disclosure may assume various alternative orientations, except where expressly specified to the contrary. It is also to be understood that the specific devices and processes illustrated in the attached drawings, and described in the following specification are simply exemplary embodiments of the inventive concepts defined in the appended claims. Hence, specific dimensions and other physical characteristics relating to the embodiments disclosed herein are not to be considered as limiting, unless the claims expressly state otherwise.

The terms "including," "comprises," "comprising," or any other variation thereof, are intended to cover a non-exclusive inclusion, such that a process, method, article, or apparatus that comprises a list of elements does not include only those elements but may include other elements not expressly listed or inherent to such process, method, article, or apparatus. An element preceded by "comprises a . . . " does not, without more constraints, preclude the existence of additional identical elements in the process, method, article, or apparatus that comprises the element.

Referring to FIGS. 1-7, reference numeral 10 generally designates a camera assembly. The camera assembly, in one aspect, is useable with an oven 12 and includes an insulating block 14 for mounting the camera against a surface 16 in contact therewith and aligned with an opening 18 through the surface 16. The insulating block 14 defines an aperture 20 therethrough, a lower side 22 of the aperture 20 being aligned with the opening 18 in the surface 16. The assembly 10 further includes a sink washer 24 having a hole 26 therethrough aligned with a top side 28 of the aperture 20 through the insulating block 14. The sink washer 24 is mounted to the insulating block 14 in partial contact therewith and extends outward from the top side 28 of the aperture 20. A camera 30 is mounted to the sink washer 24 and has a lens 32 directed through the aperture 20 in the insulating block 14 and through the opening 18 in the surface 16. The sink washer 24 directs heat away from the camera 30 and away from the surface 16. A glass substrate 34 is coupled within the lower side 22 of the aperture 20 to enclose an air gap 36 within the aperture 20 between the glass substrate 34 and a housing 38 of the camera 30.

Figure 2:
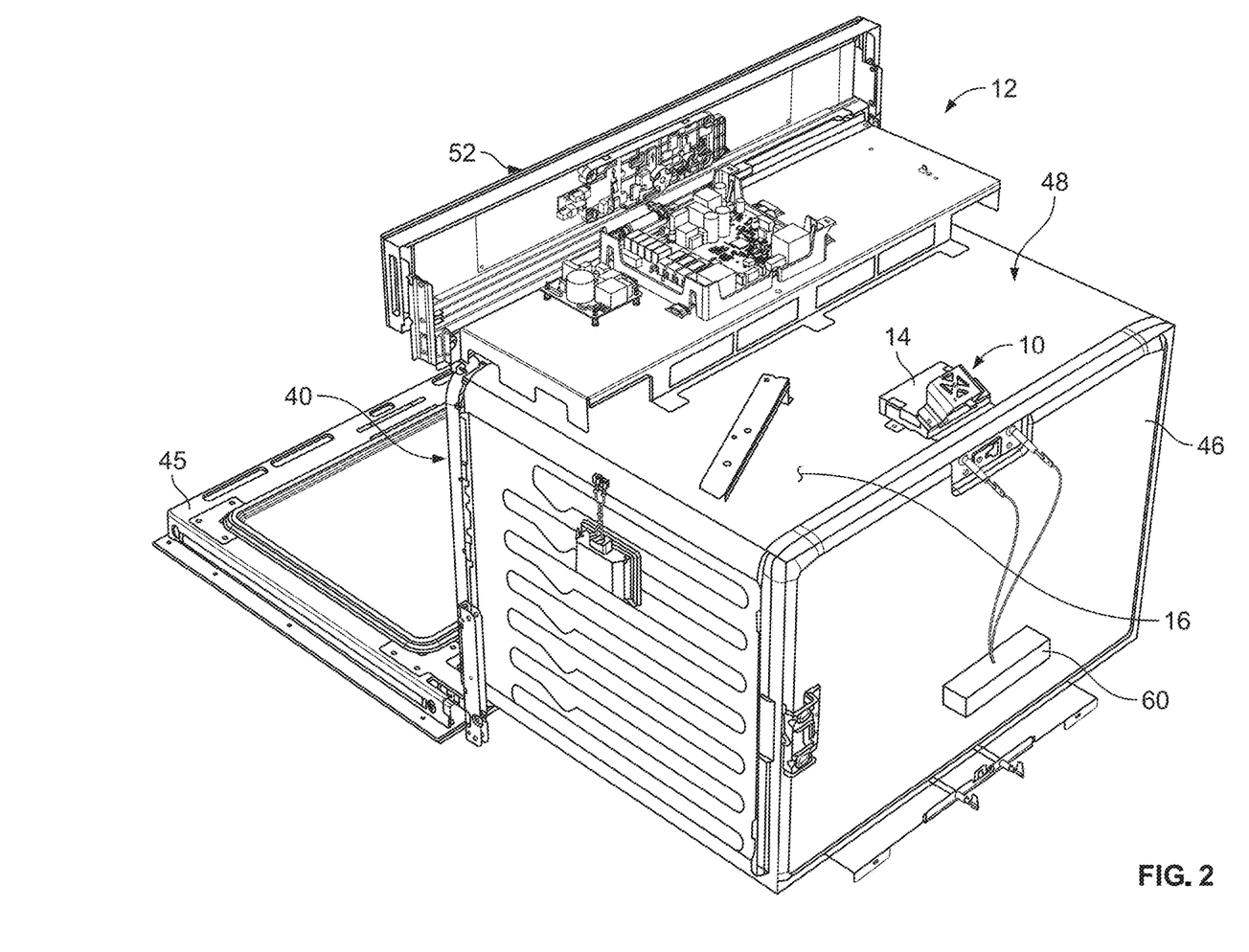
FIG. 2 is a back perspective view of the oven with certain external components removed such that a camera assembly included with the oven is shown.

In one aspect, the camera assembly 10 is particularly suited for use in an oven 12, as shown in FIGS. 1 and 2, that includes a liner 40 defining a cooking cavity 42 having an open side 44 closeable by a door 45, a back wall 46 opposite the open side 44, and a top wall 48 extending between the open side 44 and the back wall 46 and defining the above-mentioned surface 16 on which the camera assembly 10 is mounted. In this respect, the top wall 48 includes the camera opening 18, defined therethrough in a position more proximate to the back wall 46 than the open side 44. The camera assembly 10 is mounted, as shown in FIG. 2, on the top wall 48 of the liner 40 outside the cooking cavity 42 with the insulating block 14 contacting the top wall 48 of the liner 40. The lower side 22 of the aperture 20 is aligned with the camera opening 18 in the top wall 48 of the liner 40. In this arrangement, the insulating block 14 reduces thermal transmission from the liner 40 (which is appreciated as being heated during use of the oven) to the camera, with the sink washer 24 further directing heat away from the camera 30 in a direction away from the top wall 48 of the liner 40. In this manner, the insulating block 14 can be made of an insulating material, such as a high-density, thermally-resistant foam, including Polyester or Ether foams, or the like, that conducts little heat upward through the block while being resistant to heat, while being sufficiently stable to retain a position of camera 30 (including by fastening thereto).

Referring to FIGS. 1 and 2, the oven 12 is configured to cook one or more food items that are disposed within the cavity 42, such as with a heating element that increases a temperature of the one or more food items disposed within the cavity 42 via electrical resistance, microwave emissions, or the combustion of a gas (e.g., natural gas, propane, butane, and so on). The oven 12 may be considered to be a "wall oven," where an outer cabinet 50 of the oven 12 is mostly hidden behind paneling or other structural features of a kitchen or another room where the oven 12 is disposed. The oven 12 may be elevated in such instances from a floor of the kitchen or another room where the oven 12 is disposed. In other implementations, the oven 12 can be part of a "range" unit and further includes a cooktop (not illustrated) disposed above the liner 40. In such implementations, the oven 12 may be of the "slide-in" variety where cabinetry, paneling, or other structural features within the kitchen (or other room) generally hides the cabinet 50 of the oven 12, or may be of the "freestanding" variety where cabinetry, paneling, or other structural features of the kitchen (or other room) do not hide the cabinet 50 of the oven 12 but, rather, a covering (not illustrated) covers the cabinet 50 of the oven 12.

The oven 12 further includes the above-mentioned door 45 to selectively deny or allow access to the cavity 42 (through the open side 44) from an external environment. The door 45 includes a closed position where the door 45 denies access to the cavity 42 from the external environment. In addition, the door 45 includes an opened position, where the door 45 allows access to the cavity 42 from the external environment. The door 45 is able to move to, from, and between the closed position and the opened position. The door 45 may be in the closed position while the oven 12 is cooking the one or more food items so that the cavity 42 retains heat that the oven 12 generates. A user of the oven 12 may transition the door 45 from the closed position to the opened position to place the one or more food items into the cavity 42 or to remove the one or more food items from the cavity 42, such as after the oven 12 has cooked the one or more food items.

Figure 3:
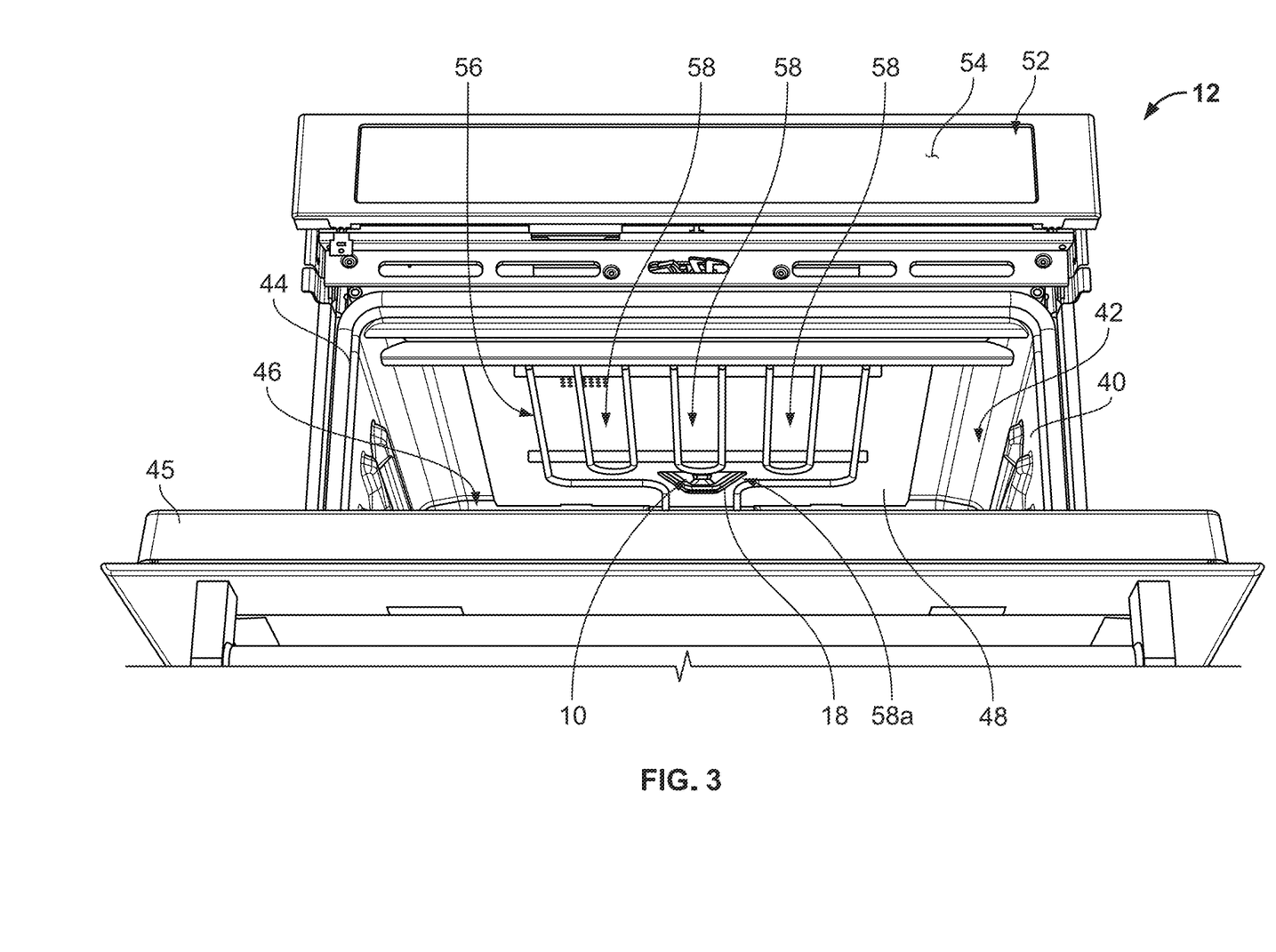
FIG. 3 is a lower perspective view of a cavity of the oven showing the positioning of the camera assembly.
Figure 4:
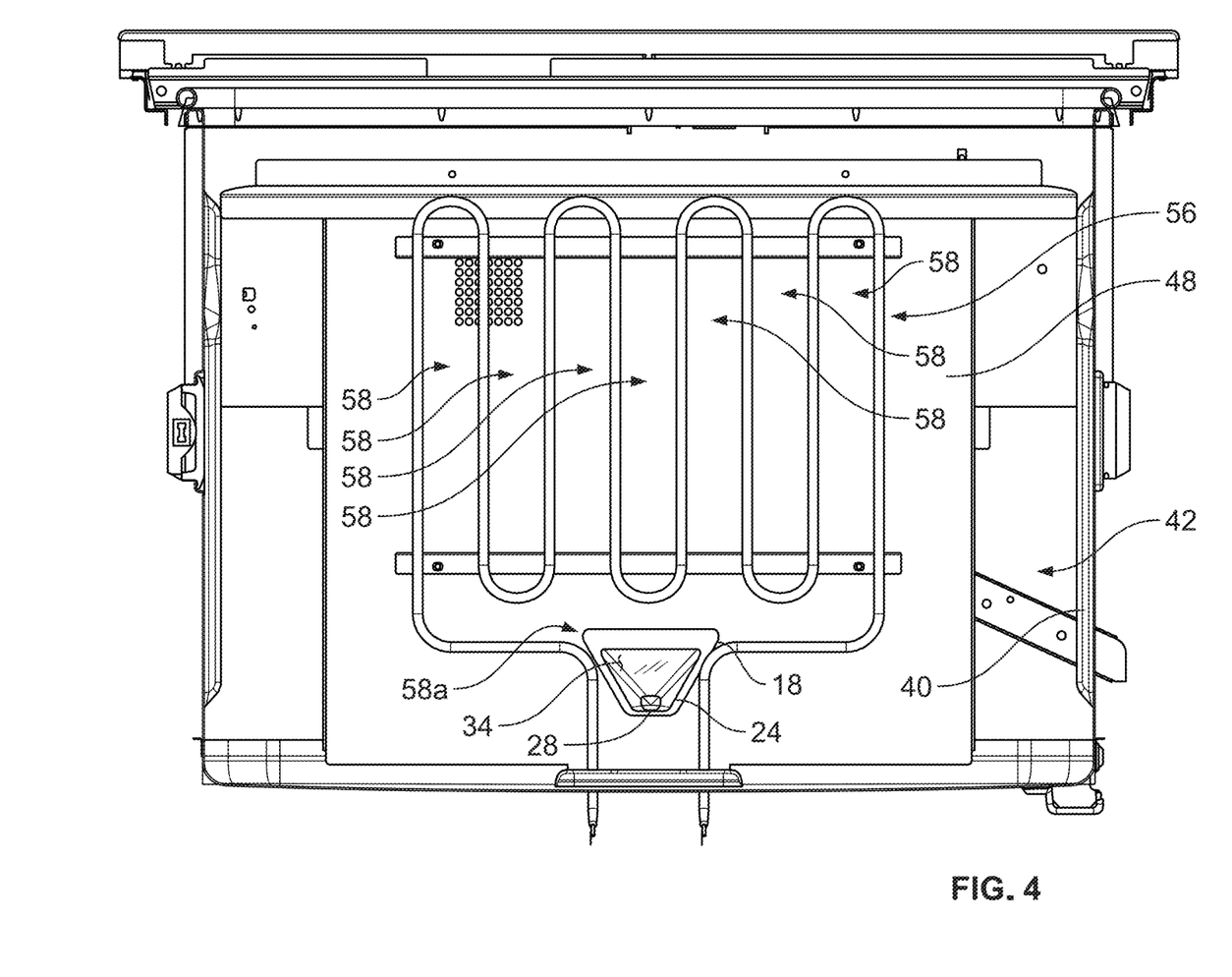
FIG. 4 is a bottom cross-section view taken along line IV-IV in FIG. 1, further showing the position of the camera assembly within the oven cavity.

In certain implementations, the oven 12 further include a human-machine interface 52. The human-machine interface 52 may include buttons, a touch screen display 54, among other items that allow the user to control operation of the oven 12. The human-machine interface 52 is usable from the external environment, and, in one configuration, is disposed above the door 45. In one aspect, the human-machine interface 52 can be configured to display an image, including a live video feed, from the camera 30 such that the user can see the food product during cooking. In this respect, the location of the camera 30, as shown in FIGS. 3 and 4 in particular, toward the back wall 46 of the liner 40 provides a useful view of the food product not visible through the door 45, including through a window included therein.

As further shown, the positioning of the camera assembly 10 along the top wall 48 and toward the back wall 46 of the cavity 42 can place the camera 30 adjacent a high-heat portion of the cavity 42. In one aspect, the camera 30 can be positioned within about 20 cm of the back wall 46 of the liner 40 or, in a further aspect, within about 10 cm or less. The camera assembly 10 can be generally centrally disposed in a lateral direction along the top wall 48, with some variation therefrom being contemplated for packaging of the camera assembly 10 within the cabinet 50 and around other internal components of the oven 12. In particular, the oven 12 can include a broiler element 56 mounted on the top wall 48 of the liner 40. In the illustrated example, the broiler element 56 is a resistive-heating element defined by a conductive rod structure that circulates in loops 58 that extend generally between the back wall 46 and the open side 44. The electric broiler element 56 is, further, electrically connected with a power supply 60 of the oven 12 by a portion of at least one loop extending through the back wall 46 of the cavity 42 (FIG. 2) and defining a plurality of loops 58a extending through the back wall 46 of the liner 40. The camera opening 18 in the liner 40 can be positioned within an interior of one of the plurality of loops 58, including the loop 58a that connects with the back wall 46. This arrangement further subjects the camera 30 to potential high heat, particularly during use of the broiler 56, including higher temperatures than toward the door 45. In this manner, the camera assembly 10 is structured to withstand high heat during operation of the camera 30 and the oven 12 under normal conditions (including use of the broiler 56), as well as to protect the camera 30 during self-cleaning operations (when the camera is off, but the temperature within the oven cavity 42 is higher than when used for cooking).

As discussed above, the use of the insulating block 14 between the top wall 48 of the liner 40 and the camera 30 reduces the heat that reaches the camera 30. As discussed, the insulating block 14 is made from a material with a generally high R-value such that little heat is transmitted therethrough. In this arrangement, the insulating block 14 can be at least about 15 mm thick and in one aspect about 20 mm thick. The insulating block 14 can also extend around the camera 30 by an appreciable distance to block heat from the top wall 48 of the liner 40 from radiating into the ambient environment surrounding the camera 30. In this respect, the insulating block 14 can be about 100 mm (in a lateral direction parallel with the back wall 46) by 70 mm (in a longitudinal direction between the back wall 46 and the open side 44). As further shown in FIGS. 5 and 6, the housing 38 of the camera 30 is at least partially mounted or secured in place with respect to the insulating block 14 by way of sink washer 24, which may be of a heat-conductive material, such as aluminum or the like, to provide an additional structure to draw heat away from the insulating block 14 and/or the camera housing 38 for dissipation into the ambient environment within the cabinet 50. In one aspect, the camera assembly 10 can be positioned within or adjacent a forced air path 62 of the internal cooling structure of the oven 12 (which may be generated by a fan within the cabinet 50). In this manner, the sink washer 24 can extend within the forced air flow path 62 to further increase the effectiveness of the forced air in cooling the camera 30. In particular, the camera housing 38 can be of a metallic material to conduct heat that may be generated by the camera 30 itself into the sink washer 24 for dissipation into the ambient environment surrounding the camera 30. The sink washer 24 can further include a number of fins 64 that extend from a major surface 66 thereof that surrounds and extends laterally away from the hole 26. In particular, the fins 64 can extend in a direction away from the insulating block 14 with the camera body 38 positioned between the fins 64. In this arrangement, the fins 64 can extend into the forced air path 62.

The sink washer 24 can be structured to have limited contact with the insulating block 14. In particular, the sink washer 24 can include a flange 68 surrounding the hole 26 in the major surface 66 and extending away from the major surface 66. In this arrangement, the flange 68 can contact the insulating block 14 so as to space the major surface 66 away from the insulating block 14. This structure can define an air gap 70 adjacent the insulating block 14 for further insulation of the sink washer 24 and the camera housing 38. In a similar manner, the sink washer 24 can further include first and second screw holes 72 defined in bases 74 surrounding the first and second screw holes 72, respectively, and also extending away from the major surface 66 to contact the insulating block 14. The screw holes 72 can receive mounting screws to retain the sink washer 24 with the insulating block 14 and the bases 74 can help to space the major surface 66 in the spaced-apart relationship from the insulating block 14 established by the flange 68.

Figure 6:
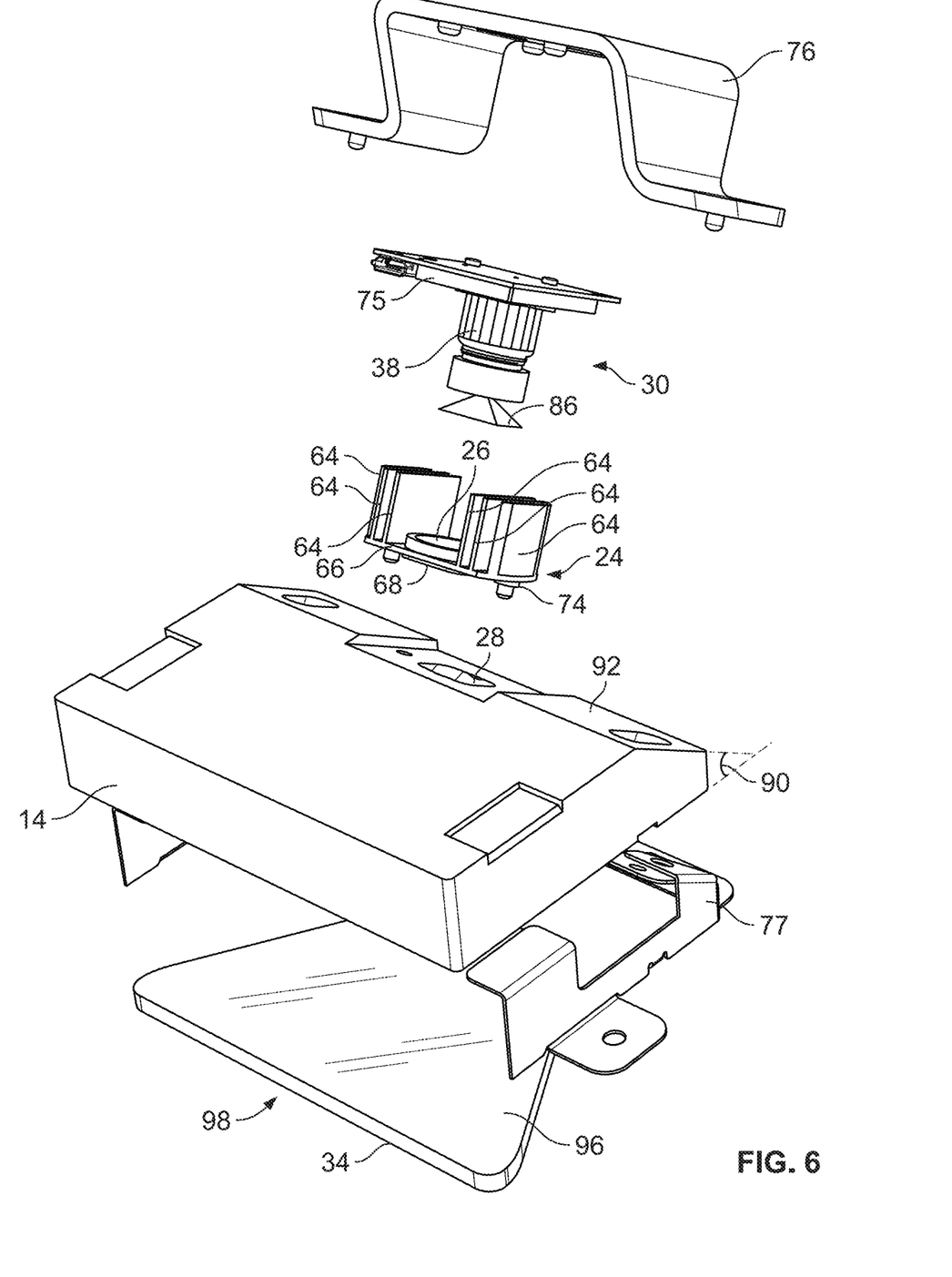
FIG. 6 is a top perspective exploded view of the camera assembly.
Figure 7:
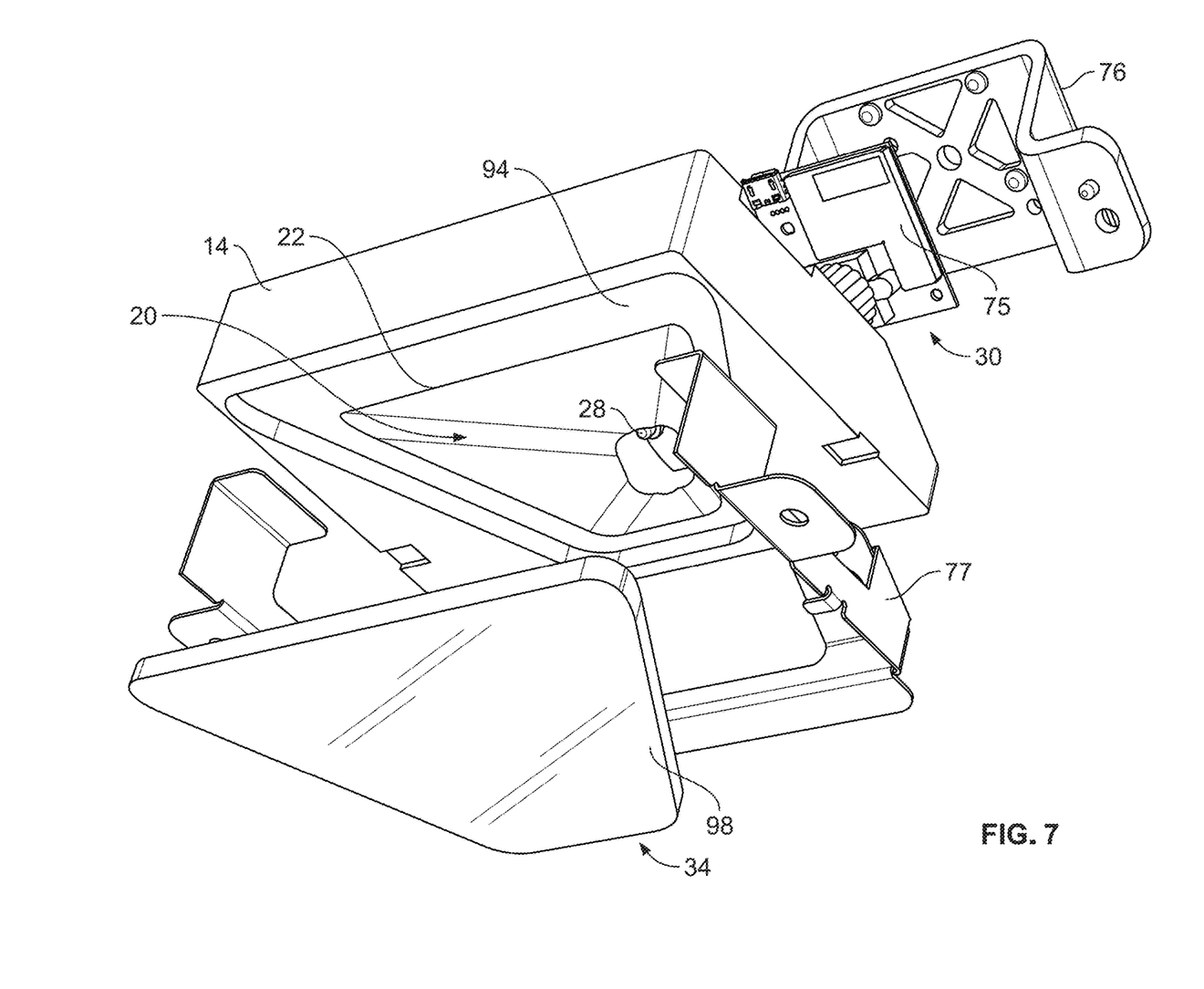
FIG. 7 is a bottom perspective exploded view of the camera assembly.

In a further aspect, a bracket 76 can be attached to the housing 38 of the camera assembly 10 opposite the sink washer 24. The bracket 76 can attach to a holder 77 of a rigid material (such as metal or plastic) that can retain the insulating block 14 in the desired location along the top wall 48 of the liner 40 to provide more rigid attachment for the camera 30 than the mounting of the sink washer 24 to the insulating block 14 (FIG. 6). The bracket 76 can enclose the camera 30 and sink washer 24 along the top and lateral portions thereof and can help to direct a portion of the forced air path 62 over the camera housing 38 and the sink washer 24. The bracket 76 can, particularly, attach a portion of the camera housing 38 that supports electronic components 75 of the camera 30 and can be of metal to further shunt heat away from the sensitive components.

Figure 5:
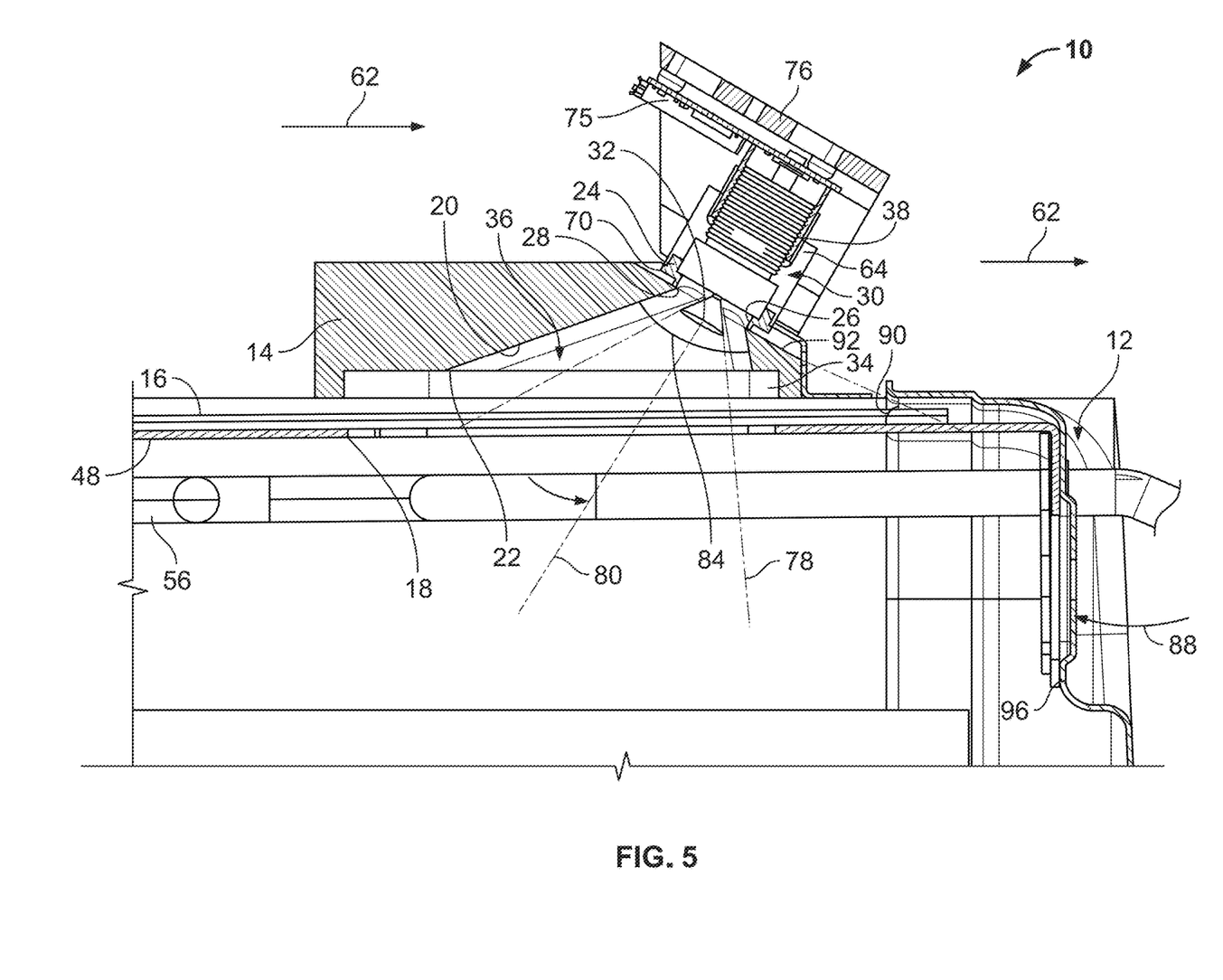
FIG. 5 is a cross-section view taken along line V-V in FIG. 1 and showing components of the camera assembly.

As further shown in FIG. 5, the aperture 20 of the insulating block 14 is structured to generally accommodate a field of view 78 of the camera 30 in alignment with the camera opening 18 in the top wall 48 of the liner 40. In particular, the camera 30 can have a field of view 78 that is centered around an axis 80 and extends away from a lens 32 along the axis 80 to define a viewing angle of the field of view 78 (which may be generally elliptical such that different angles are realized in different directions). Accordingly, to prevent the aperture 20 from restricting or blocking a portion of the field of view 78, the aperture 20 can taper outwardly from the upper side 28 of the aperture 20 to the lower side 22 of the aperture 20 at an angle 84 approximately equal to the field of view 78 of the camera 30. In one aspect, the upper side 28 of the aperture 20 can be configured to receive a lens barrel 86 of the camera 30 therein, which establishes the aperture 20 as being somewhat (e.g. 1 mm to 2 mm) larger than the field of view 78 such that some general variation in the angle 84 at which the aperture 20 tapers outward is permitted; however, the permitted variation is lower with respect to a smaller angle 84 than a larger one. In this respect, the angle 84 may vary from the field of view 78 angle in each direction by between about +5° to −1°. In a further aspect, the angle 84 may be configured to not be excessively large, as the increase in angle 84 reduces the amount of material in the insulation block 14, which may adversely affect the insulation provided thereby. The opening 18 in the top wall 48 can be shaped to generally correspond to the size and shape of the lower side 22 of the aperture 20, with some variation to receive the above-mentioned glass substrate 34, which is discussed further below.

To provide the desired view of the oven cavity 42 by way of camera 30, the sink washer 24 can be mounted to the insulating block 14 to retain the camera 30 with the axis 80 of the field of view 78 directed at an angle 88 away from the back wall 46 of the cavity 42. In one aspect, the axis 80 can be positioned at an angle 88 of approximately 30° from the back wall 46 so as to provide a downward view of the back of food product(s) within the cavity 42. To achieve this viewing angle 88, the major surface 66 of the sink washer 24 can be oriented at an angle 90 of approximately 30° with respect to the top wall 48 of the cavity 42. The insulating block 14 can define a mounting surface 92 to which the camera 30 is mounted, including by way of the sink washer 24 and/or the bracket 76 discussed above. The mounting surface 92 can be positioned at the above-mentioned angle 90 of approximately 30° relative to the top wall 48 of the cavity 42 to retain the camera 30 with the axis 80 of the field of view 78 directed at the desired 30° angle away from the back wall 46 of the cavity 42. Variations in the structure of the mounting surface 92 and the resulting angle 88 of the camera 30 can be made for particular locations of the camera assembly 10, according to the principles discussed herein, as well as the specific implementation of the camera 30 used in the assembly 10. As further illustrated, the aperture 20 can be oriented to extend normal to the mounting surface 92 so as to be oriented along the axis 80 of the field of view 78, including at the angle 88 at which the camera 30 is positioned.

As discussed above, the camera assembly 10 can further include the glass substrate 34 coupled within the lower side 22 of the aperture 20 to enclose the air gap 36 within the aperture 20 between the glass substrate 34 and the housing 38 of the camera 30. The glass substrate 34 can be glued into the lower side 22 of the aperture 20, including within a lower cavity 94 (FIG. 7) that extends outward from the aperture 20 to provide surface area for the glue or other adhesive to be deposited. The glass substrate 34 has an outer surface 98 exposed to the cavity 94 through the camera opening 18 and an inner surface 96 within the air gap 36. The glass substrate 34 can have an infrared (IR) reflective coating on both the inner 96 and an outer 98 surface thereof to reduce the transmittal of any heat radiation through glass substrate 34. Additionally, the air gap 36 within the aperture 20 that results from the sealing of the glass substrate 34 over the lower side 22 of the aperture 20 further insulates the camera 30 from heat radiation from the oven cavity 42. Additionally, the presence of the glass substrate 34 prevents dirt and moisture from reaching the lens barrel 86 and the lens 32 of the camera 30.

The invention disclosed herein is further summarized in the following paragraphs and is further characterized by combinations of any and all of the various aspects described therein.

According to another aspect of the present disclosure, an oven includes a liner defining a cooking cavity having an open side, a back wall opposite the open side, and a top wall extending between the open side and the back wall. The top wall has a camera opening defined therethrough in a position more proximate to the back wall than the front wall. The oven further includes a camera assembly mounted on the top wall of the liner outside the cooking cavity and having an insulating block contacting the top wall of the liner and defining an aperture therethrough. A lower side of the aperture is aligned with the camera opening in the top wall of the liner. The camera assembly also has a sink washer having a hole therethrough aligned with a top side of the aperture through the insulating block. The sink washer is mounted to the insulating block in partial contact therewith and extending outward from the top side of the aperture. A camera is mounted to the sink washer and has a lens directed through the aperture in the insulating block and through the camera opening in the top wall of the liner. The sink washer directs heat from the camera away from the camera and away from the top wall of the liner.

The sink washer can include a major surface extending outwardly around the opening and a flange surrounding the opening and extending away from the major surface, the flange contacting the insulating block and spacing the major surface away therefrom.

The sink washer can further include first and second fins extending from the major surface in a direction away from the insulating block and opposite the flange, the camera having a body positioned between the fins.

The sink washer can further include first and second screw holes defined in bases surrounding the first and second screw holes, respectively, and extending away from the major surface to contact the insulating block and receive mounting screws to retain the sink washer with the insulating block with the major surface spaced away therefrom.

The camera can have a field of view centered around an axis and extending away therefrom in a direction away from a lens of the camera along the axis to define a viewing angle, and the aperture in the insulating block can taper outwardly from the upper side of the aperture to the lower side of the aperture at an angle approximately equal to the viewing angle of the camera.

The sink washer can be mounted to the insulating block to retain the camera with the axis of the field of view directed at an angle away from the back wall of the cavity, and the aperture can be oriented to extend along the axis of the field of view.

The insulating block can define a mounting surface to which the camera is mounted, the mounting surface being positioned to retain the camera with the axis of the field of view directed at an angle away from the back wall of the cavity, and the aperture can be oriented to extend along the axis of the field of view.

The camera assembly can further include a glass substrate coupled within the lower side of the aperture to enclose an air gap within the aperture between the glass substrate and a housing of the camera.

The glass substrate can include an outer surface exposed to the cavity through the camera opening and an inner surface within the air gap, the inner and outer surfaces being coated with an infrared-reflecting coating to prevent infrared radiation from the oven cavity from entering the air gap.

The camera assembly can further include an upper bracket extending over a housing of the camera extending away from the insulating block to direct a flow of air over the top wall of the cavity over the housing of the camera.

A printed circuit board of the camera can be positioned in contact with the upper bracket.

The camera can include a housing of a metallic material to conduct heat into the sink washer and into an ambient environment surrounding the camera.

The camera can be positioned within about 10 cm of the back wall of the liner.

The oven can further include a broiler element mounted on the top wall of the cavity, electrically connected with a power supply of the oven through the back wall of the cavity and defining a plurality of loops extending between the back wall and the opening, and the camera aperture can be positioned within an interior of one of the plurality of loops.

According to yet another aspect, an oven includes a liner defining a cooking cavity having an open side, a back wall opposite the open side, and a top wall extending between the open side and the back wall. The top wall has a camera opening defined therethrough in a position more proximate to the back wall than the front wall. The oven further includes a camera assembly mounted on the top wall of the liner outside the cooking cavity and including an insulating block contacting the top wall of the liner and defining an aperture therethrough. A lower side of the aperture is aligned with the camera opening in the top wall of the liner. The camera assembly further includes a camera mounted over the insulating block and having a lens directed through the aperture in the insulating block and through the camera opening in the top wall of the liner and a glass substrate coupled within the lower side of the aperture to enclose an air gap within the aperture between the glass substrate and a housing of the camera.

The glass substrate can include an outer surface exposed to the cavity through the camera opening and an inner surface within the air gap, the inner and outer surfaces being coated with an infrared-reflecting coating to prevent infrared radiation from the oven cavity from entering the air gap.

The camera can have a field of view centered around an axis and extending away therefrom in a direction away from a lens of the camera along the axis to define a viewing angle, and the aperture in the insulating block can taper outwardly from the upper side of the aperture to the lower side of the aperture at an angle approximately equal to the viewing angle of the camera.

The insulating block can define a mounting surface to which the camera is mounted, the mounting surface being positioned to retain the camera with the axis of the field of view directed at an angle away from the back wall of the cavity, and the aperture can be oriented to extend along the axis of the field of view.

The camera assembly can further include a sink washer having a hole therethrough aligned with a top side of the aperture through the insulating block, the sink washer mounted to the insulating block in partial contact therewith and extending outward from the top side of the aperture, the camera can be mounted to the insulating block via the sink washer, and the sink washer can direct heat from the camera away from the camera and away from the top wall of the liner.

The sink washer can include a major surface extending outwardly around the opening and a flange surrounding the opening and extending away from the major surface, the flange contacting the insulating block and spacing the major surface away therefrom.

According to yet another aspect, a camera assembly includes an insulating block for mounting the camera against a surface in contact therewith and aligned with an opening through the surface. The insulating block defines an aperture therethrough, a lower side of the aperture being aligned with the opening in the surface. The assembly further includes a sink washer having a hole therethrough aligned with a top side of the aperture through the insulating block. The sink washer is mounted to the insulating block in partial contact therewith and extending outward from the top side of the aperture. A camera is mounted to the sink washer and has a lens directed through the aperture in the insulating block and through the opening in the surface. The sink washer directs heat from the camera away from the camera and away from the surface. A glass substrate is coupled within the lower side of the aperture to enclose an air gap within the aperture between the glass substrate and a housing of the camera.

It will be understood by one having ordinary skill in the art that construction of the described disclosure and other components is not limited to any specific material. Other exemplary embodiments of the disclosure disclosed herein may be formed from a wide variety of materials, unless described otherwise herein.

For purposes of this disclosure, the term "coupled" (in all of its forms, couple, coupling, coupled, etc.) generally means the joining of two components (electrical or mechanical) directly or indirectly to one another. Such joining may be stationary in nature or movable in nature. Such joining may be achieved with the two components (electrical or mechanical) and any additional intermediate members being integrally formed as a single unitary body with one another or with the two components. Such joining may be permanent in nature or may be removable or releasable in nature unless otherwise stated.

It is also important to note that the construction and arrangement of the elements of the disclosure as shown in the exemplary embodiments is illustrative only. Although only a few embodiments of the present innovations have been described in detail in this disclosure, those skilled in the art who review this disclosure will readily appreciate that many modifications are possible (e.g., variations in sizes, dimensions, structures, shapes and proportions of the various elements, values of parameters, mounting arrangements, use of materials, colors, orientations, etc.) without materially departing from the novel teachings and advantages of the subject matter recited. For example, elements shown as integrally formed may be constructed of multiple parts or elements shown as multiple parts may be integrally formed, the operation of the interfaces may be reversed or otherwise varied, the length or width of the structures and/or members or connector or other elements of the system may be varied, the nature or number of adjustment positions provided between the elements may be varied. It should be noted that the elements and/or assemblies of the system may be constructed from any of a wide variety of materials that provide sufficient strength or durability, in any of a wide variety of colors, textures, and combinations. Accordingly, all such modifications are intended to be included within the scope of the present innovations. Other substitutions, modifications, changes, and omissions may be made in the design, operating conditions, and arrangement of the desired and other exemplary embodiments without departing from the spirit of the present innovations.

It will be understood that any described processes or steps within described processes may be combined with other disclosed processes or steps to form structures within the scope of the present disclosure. The exemplary structures and processes disclosed herein are for illustrative purposes and are not to be construed as limiting.

What is claimed is:

1. An oven, comprising:
  a liner defining a cooking cavity having an open side, a back wall opposite the open side, and a top wall extending between the open side and the back wall, the top wall having a camera opening defined therethrough in a position more proximate to the back wall than the open side; and
  a camera assembly mounted on the top wall of the liner outside the cooking cavity and including:
    an insulating block contacting the top wall of the liner and defining an aperture therethrough, a lower side of the aperture being aligned with the camera opening in the top wall of the liner;
    a sink washer having a hole therethrough aligned with a top side of the aperture through the insulating block, the sink washer mounted to the insulating block in partial contact therewith and extending outward from the top side of the aperture; and
    a camera mounted to the sink washer and having a lens, the camera further having a field of view centered around an axis and extending away therefrom in a direction away from the lens of the camera along the axis to define a viewing angle directed through the aperture in the insulating block and through the camera opening in the top wall of the liner, the aperture in the insulating block tapers outwardly from the top side of the aperture to the lower side of the aperture at an opening angle approximately equal to the viewing angle of the camera, and the sink washer directing heat away from the camera and away from the top wall of the liner.

2. The oven of claim 1, wherein the sink washer includes:
a major surface extending outwardly around the opening; and
a flange surrounding the opening and extending away from the major surface, the flange contacting the insulating block and spacing the major surface away therefrom.

3. The oven of claim 2, wherein the sink washer further includes a first fin and a second fin extending from the major surface in a direction away from the insulating block and opposite the flange, the camera having a body positioned between the first fin and the second fin.

4. The oven of claim 2, wherein the sink washer further includes a first base and a second base spaced from the flange and extending away from the major surface to contact the insulating block and receive mounting screws to retain the sink washer with the insulating block with the major surface spaced away therefrom.

5. The oven of claim 1, wherein:
the sink washer is mounted to the insulating block to retain the camera with the axis of the field of view directed at an orientation angle away from the back wall of the cooking cavity; and
the aperture is oriented to extend along the axis of the field of view.

6. The oven of claim 1, further including a glass substrate coupled within the lower side of the aperture to enclose an air gap within the aperture between the glass substrate and a housing of the camera.

7. The oven of claim 6, wherein the glass substrate includes an outer surface exposed to the cooking cavity through the camera opening and an inner surface within the air gap, the inner and the outer surfaces being coated with an infrared-reflecting coating to prevent infrared radiation from the cooking cavity from entering the air gap.

8. The oven of claim 1, further including an upper bracket extending over a housing of the camera extending away from the insulating block to direct a flow of air over the top wall of the cooking cavity over the housing of the camera.

9. The oven of claim 8, wherein an electronic component of the camera is positioned in contact with the upper bracket.

10. The oven of claim 1, wherein the camera includes a housing of a metallic material to conduct heat into the sink washer and into an ambient environment surrounding the camera.

11. The oven of claim 1, wherein the camera is positioned within about 10 cm from the back wall of the liner.

12. The oven of claim 1, further including a broiler element mounted on the top wall of the cooking cavity, electrically connected with a power supply of the oven through the back wall of the cooking cavity and defining a plurality of loops extending between the back wall and the opening, wherein:
the camera aperture is positioned within an interior of one of the plurality of loops.

13. An oven, comprising:
a liner defining a cooking cavity having an open side, a back wall opposite the open side, and a top wall extending between the open side and the back wall, the top wall having a camera opening defined therethrough in a position more proximate to the back wall than the open side; and
a camera assembly mounted on the top wall of the liner outside the cooking cavity and including:
an insulating block contacting the top wall of the liner and defining an aperture therethrough, a lower side of the aperture being aligned with the camera opening in the top wall of the liner;
a camera mounted over the insulating block and having a lens and a field of view centered around an axis and extending away therefrom in a direction away from the lens of the camera along the axis to define a viewing angle directed through the aperture in the insulating block and through the camera opening in the top wall of the liner; and
a glass substrate coupled within the lower side of the aperture to enclose an air gap within the aperture between the glass substrate and a housing of the camera;
wherein the aperture in the insulating block tapers outwardly from an upper side of the aperture to the lower side of the aperture at an opening angle approximately equal to the viewing angle of the camera.

14. The oven of claim 13, wherein the glass substrate includes an outer surface exposed to the cooking cavity through the camera opening and an inner surface within the air gap, the inner and outer surfaces being coated with an infrared-reflecting coating to prevent infrared radiation from the cooking cavity from entering the air gap.

15. The oven of claim 13, wherein:
The insulating block defines a mounting surface to which the camera is mounted, the mounting surface being positioned to retain the camera with the axis of the field of view directed at an orientation angle away from the back wall of the cooking cavity; and
the aperture is oriented to extend along the axis of the field of view.

16. The oven of claim 13, wherein:
the camera assembly further includes a sink washer having a hole therethrough aligned with a top side of the aperture through the insulating block, the sink washer mounted to the insulating block in partial contact therewith and extending outward from the top side of the aperture;
the camera is mounted to the insulating block via the sink washer; and
the sink washer directs heat from the camera away from the camera and away from the top wall of the liner.

17. The oven of claim 16, wherein the sink washer includes:
a major surface extending outwardly around the opening; and
a flange surrounding the opening and extending away from the major surface, the flange contacting the insulating block and spacing the major surface away therefrom.

18. A camera assembly, comprising:
an insulating block for mounting against and in contact with a surface and aligned with an opening through the surface, the insulating block defining an aperture therethrough, a lower side of the aperture being aligned with the opening in the surface;
a sink washer having a hole therethrough aligned with a top side of the aperture through the insulating block, the sink washer mounted to the insulating block in partial contact therewith and extending outward from the top side of the aperture, the sink washer including:
a major surface extending outwardly around the opening and a flange surrounding the opening and extending away from the major surface, the flange contacting the insulating block and spacing the major surface away therefrom;
  a first fin and a second fin extending from the major surface in a direction away from the insulating block and opposite the flange, the sink washer; and
  a first base and a second base spaced from the flange and extending away from the major surface to contact the insulating block and receive mounting screws to retain the sink washer with the insulating block with the major surface spaced away therefrom;
a camera mounted to the sink washer and having a lens, the camera further having a field of view centered around an axis and extending away therefrom in a direction away from the lens of the camera along the axis to define a viewing angle directed through the aperture in the insulating block and through the opening in the surface, the sink washer directing heat away from the camera and away from the surface, the camera further having a body positioned between the first fin and the second fin; and
a glass substrate coupled within the lower side of the aperture to enclose an air gap within the aperture between the glass substrate and a housing of the camera.

* * * * *